March 13, 1962  G. ALFIERI  3,025,077
COMPRESSED AIR DISTRIBUTING PLANT FOR PNEUMATIC SUSPENSIONS
Filed June 23, 1960

United States Patent Office 3,025,077
Patented Mar. 13, 1962

3,025,077
COMPRESSED AIR DISTRIBUTING PLANT FOR PNEUMATIC SUSPENSIONS
Giuseppe Alfieri, Milan, Italy, assignor to Fabbrica Italiana Magneti Marelli S.p.A., Milan, Italy, a firm
Filed June 23, 1960, Ser. No. 38,361
Claims priority, application Italy June 26, 1959
3 Claims. (Cl. 280—124)

The present invention deals with a compressed air distributing plant for pneumatic suspensions, particularly for towed vehicles, and of the type essentially comprising an air reservoir tank, at least a self-acting leveling device connected by a delivery pipe to said tank, and an electro distributing device acting on the delivery pipe, in order to permit feeding of the levelling device by means of excitation.

The use of levelling devices in the pneumatic suspensions of vehicles is already known, for the purpose of maintaining the frame or chassis thereof at practically the same height under variable conditions of load as they act on the vehicle.

In servo-activated types of levelling devices, the intervention of the device only occurs when differences of load are effected on the chassis. For this purpose, the activating circuit of the levelling device is controlled by an electro distributor device, operating in such a manner as to make the levelling device function only by means of excitation.

In the case of motor vehicles composed of a motor vehicle and trailer using pneumatic suspensions, the compressed air installation mounted on the trailer is comprised of an air reservoir tank, the self acting levelling device and the electro distributor: this latter having its electric supply deriving from the motor vehicle, and controlled from the driving position.

In some particular conditions, when it is necessary to momentarily feed the levelling device, the activation of the electro distributor might prove difficult or even impossible. This is the case of an isolated trailer, conditions in which load and exhaust operations are made, and in which the levelling device is obviously disengaged, inasmuch as the electro distributor is not in contact with the electric power supply, and as a result, cannot be excited.

With the installation and the distributing device which is the subject of the present invention, the possibility is given of activating the levelling device at will, inasmuch as this latter is fed by an auxiliary distributor mounted on the trailer, and connected to the air reservoir tank by means of a direct delivery pipe, or a pneumatic circuit controlled by the electro distributor.

The auxiliary distributor comprises a two-position manual control device, in such a manner that in one position it puts the levelling device directly in communication with the air tank, while in the other position it establishes contact between the levelling device and the air tank by means of the electro distributor.

The features of the installation will be given more clearly with the following description, and with reference to the attached drawings, in which.

Figure 1:
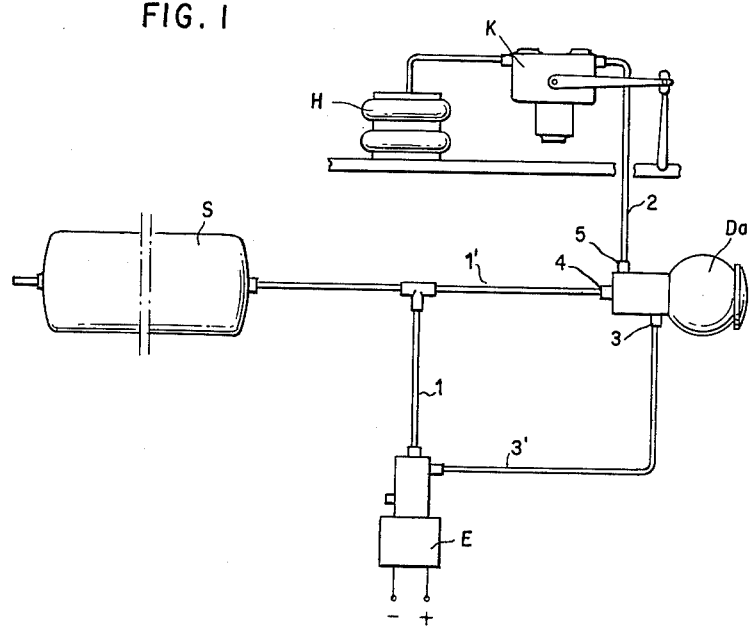
FIGURE 1 represents a schematic drawing of the compressed air plant and a connected servo-activated mechanism.

With reference to FIGURE 1: S indicates the compressed air source or air reservoir tank, E represents the electro distributor inserted in the feed circuit 1 deriving from the air tank.

According to the invention: delivery pipe 2 directed to the levelling device or levelling devices is fed by an auxiliary distributor Da connected by a junction 3 to the feed circuit 1 downstream of the electro distributor E, and with a coupling 4 directly to the air tank S by means of pipe 1'.

The auxiliary distributor Da in this manner has three couplings of which two (3 and 4) are for reception of compressed air through the parallel delivery pipes 1 or 1' respectively, and one (5) is for feeding (through the delivery pipe 2) the levelling device or devices. As here shown, the levelling device is operated by a well-known servo-activated mechanism connected to the delivery pipe 2, its principal parts being designated H and K.

Figure 2:
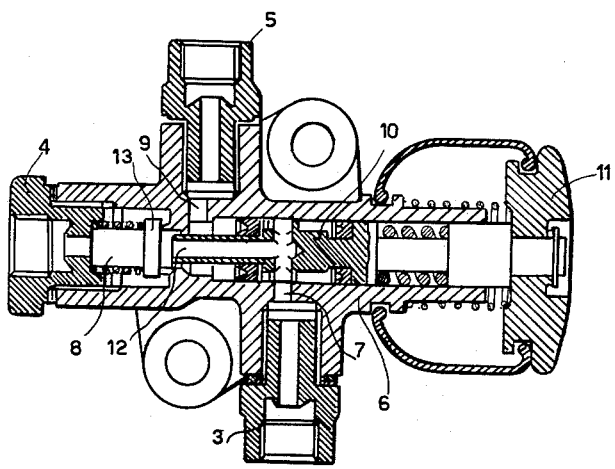
FIGURE 2 represents a longitudinal section of the auxiliary distributor.

The auxiliary distributor Da shown in FIGURE 2 is essentially comprised of a hollow body 6 with three ways 7, 8, 9 of connection with (by means of the corresponding couplings 3, 4, 5, respectively) the electro distributor E, air tank S and the levelling devices. Distributor piston 10, manually operated by push rod 11, slides in the hollow body 6 of the auxiliary distributor.

Said piston is furnished with a hole 12, shown in repose position in the drawing, which puts delivery pipe 1 in communication with pipe 2. Said piston also constitutes the operating rod for valve 13 for intercepting of way 8 with ways 7 and 9.

The operation of the auxiliary distributor is as follows: During normal functioning of the electro distributor E, the compressed air from tank S following circuit 1 arrives at the distributor coupling 3, from which it traverses ways 7, 12, 9 of the distributor and feeds the levelling devices. When the electro distributor is not excited, the air from the self-acting levelling devices follows the inverse circuit, and exhausts into the atmosphere through the exhaust ports of the electro distributor.

Under these feeding and discharge conditions, the auxiliary distributor acts as a simple coupling between the the pipe 1 downstream of the electro distributor E and pipe 2, and therefore the normal operating circuit of the installation does not require modification.

Whenever it is necessary to fed the levelling devices by means of the intervention of the auxiliary, push rod 11 is manipulated in such a manner that the operation of push rod of piston 10, coming in contact with valve 13, intercepts the communication between the levelling devices and the electro distributor exhaust, and successively, with the displacement of valve 13 from its seat, creates a communication between the compressed air source connected at 4 with the levelling devices by means of circuit 8, 9, 2 of the distributor. On releasing the push rod, the rest condition of the auxiliary distributor is restored, and the exhaust air of the levelling devices flows through the electro distributor by means of circuit 2, 9, 12, 7.

I claim:

1. A compressed air distributor plant for pneumatic suspensions comprising a compressed air tank, an electro distributor, a leveling device, and compressed air conduits connecting such members in sequence, in combination with a manually operable auxiliary distributor interposed between said electro distributor and said leveling device normally to act as a simple coupling between said electro distributor and said leveling device, a direct pipe connection between said tank and said auxiliary distributor, a normally closed valve within said auxiliary distributor closing said direct pipe connection, and a push rod slidable in said auxiliary distributor to open said valve whereby compressed air may flow from said tank to said device.

2. A compressed air distributor plant according to claim 1, wherein said auxiliary distributor is a hollow body having openings therein connected to said electro distributor, said leveling device and said direct pipe connection and wherein a distributing piston is slidably mounted to control passage of compressed air into said auxiliary distributor from said electro distributor and from said direct pipe connection.

3. A compressed air distributor plant for pneumatic suspensions comprising a compressed air reservoir tank, a servo activated leveling device, an electro distributor between said tank and said device for passing compressed air therethrough to said device when electrically excited and to atmosphere from said device when not excited, a pneumatic conduit connected between said electro distributor and said tank to supply said device with compressed air, an auxiliary distributor disposed between said electro distributor and said device, a pneumatic conduit connected between said electro distributor and said auxiliary distributor for supplying compressed air from said electro distributor to said auxiliary distributor, a pneumatc conduit connected between said auxiliary distributor and said servo activated leveling device to supply compressed air to said device, a direct pipe connection between said tank and said auxiliary distributor for supplying compressed air directly from said tank to said auxiliary distributor for passage therefrom to said servo activated leveling device, when said electro distributor is not excited, said auxiliary distributor comprising a body having a passage therethrough between said conduit connected with said electro distributor and said conduit connected to said servo activated leveling device, a valve in said auxiliary distributor biased to close the connection between said auxiliary distributor and said direct pipe connection, and a distributing piston in said auxiliary distributor slidable therein to open said valve and to close the pneumatic connection between said auxiliary distributor and said electro distributor, whereby said auxiliary distributor normally acts as a simple coupling between said electro distributor and said servo activated leveling device, and when said electro distributor is not excited said auxiliary distributor may connect said servo activated leveling device with said tank through said direct pipe connection.

References Cited in the file of this patent
UNITED STATES PATENTS

| | | |
|---|---|---|
| 2,323,927 | Mercier | July 13, 1943 |
| 2,419,443 | Eaton | Apr. 22, 1947 |